United States Patent [19]

Pohto et al.

[11] 4,231,143
[45] Nov. 4, 1980

[54] ELECTRODE AND APPARATUS FOR FORMING THE SAME

[75] Inventors: Gerald R. Pohto; Richard O. Olson, both of Mentor, Ohio

[73] Assignee: Diamond Shamrock Corporation, Dallas, Tex.

[21] Appl. No.: 951,582

[22] Filed: Oct. 16, 1978

Related U.S. Application Data

[62] Division of Ser. No. 791,725, Apr. 28, 1977, Pat. No. 4,129,292.

[51] Int. Cl.³ .............................................. B25B 27/14
[52] U.S. Cl. ................................................ 29/281.5
[58] Field of Search ........................... 29/281.1, 281.5; 269/321 F

[56] References Cited

U.S. PATENT DOCUMENTS

| | | | |
|---|---|---|---|
| 619,869 | 2/1899 | Cronin | 269/321 F |
| 1,148,713 | 8/1915 | Parry | 269/321 F |
| 1,577,701 | 3/1926 | Edmond | 269/321 F |
| 2,796,095 | 6/1957 | Joseph | 269/321 F |

Primary Examiner—James L. Jones, Jr.
Attorney, Agent, or Firm—Charles A. Muserlian; Bruce M. Winchell

[57] ABSTRACT

The specification and drawings disclose an anode assembly for use in electrolytic cells, and apparatus for forming such assemblies. The anode assembly comprises an anode riser to which is joined a parallel pair of metal sheets which form anode surfaces. The sheets are joined to the riser by connecting means which permit movement of the sheets toward and away from one another while maintaining their parallel relationship. Additionally, the connecting means is such that it maintains a tension on the sheets to prevent them from warping or assuming a non-planar configuration. The disclosed apparatus permits assembly of the sheets to the riser in a simple, rapid manner.

4 Claims, 12 Drawing Figures

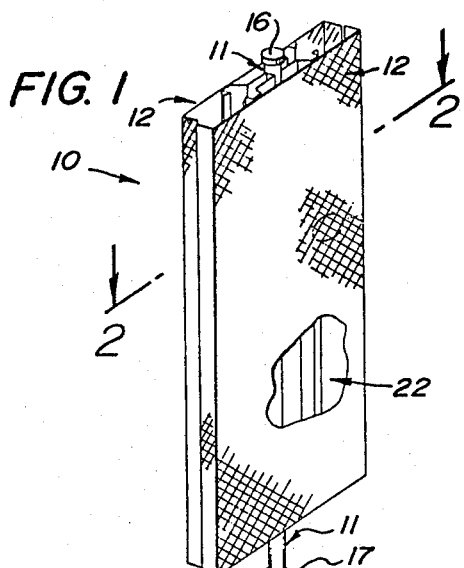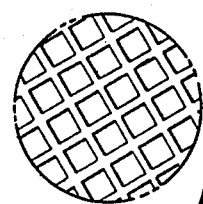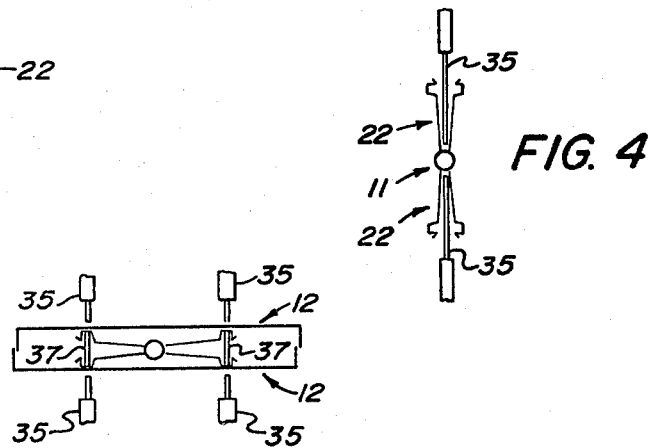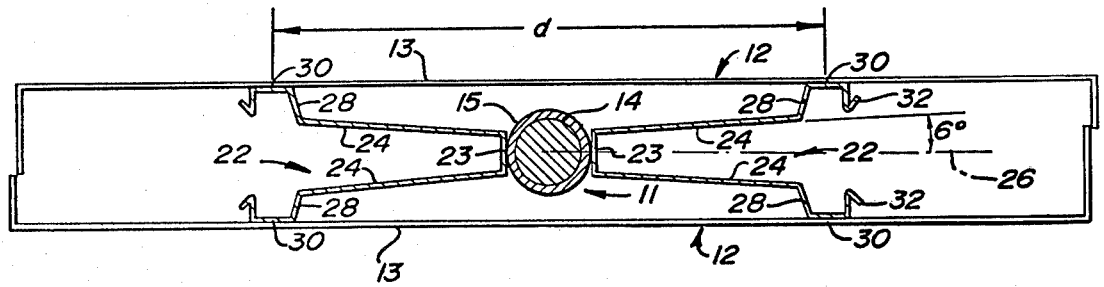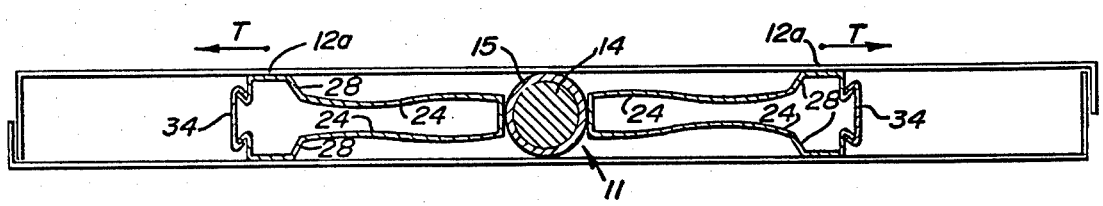

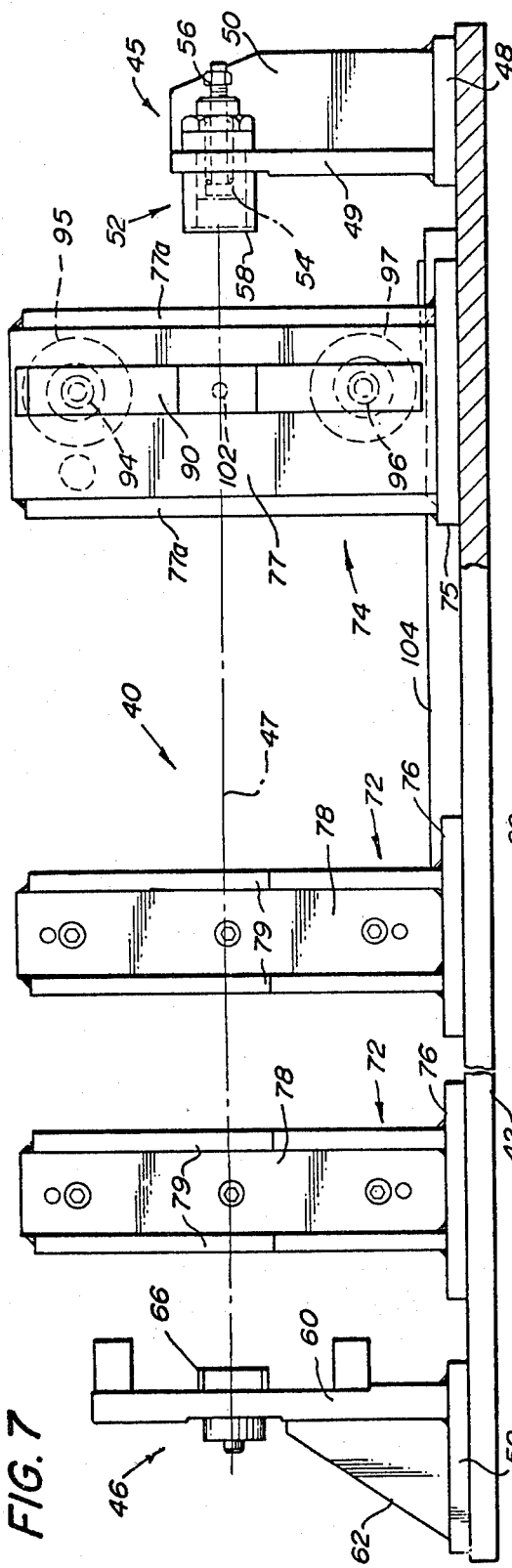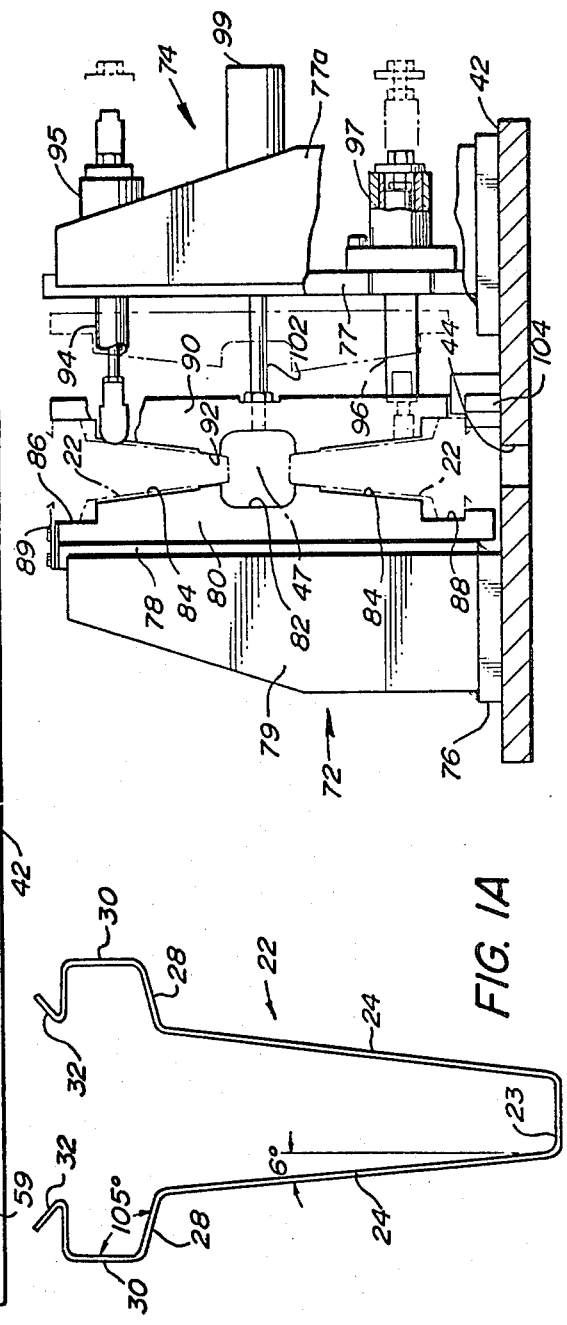

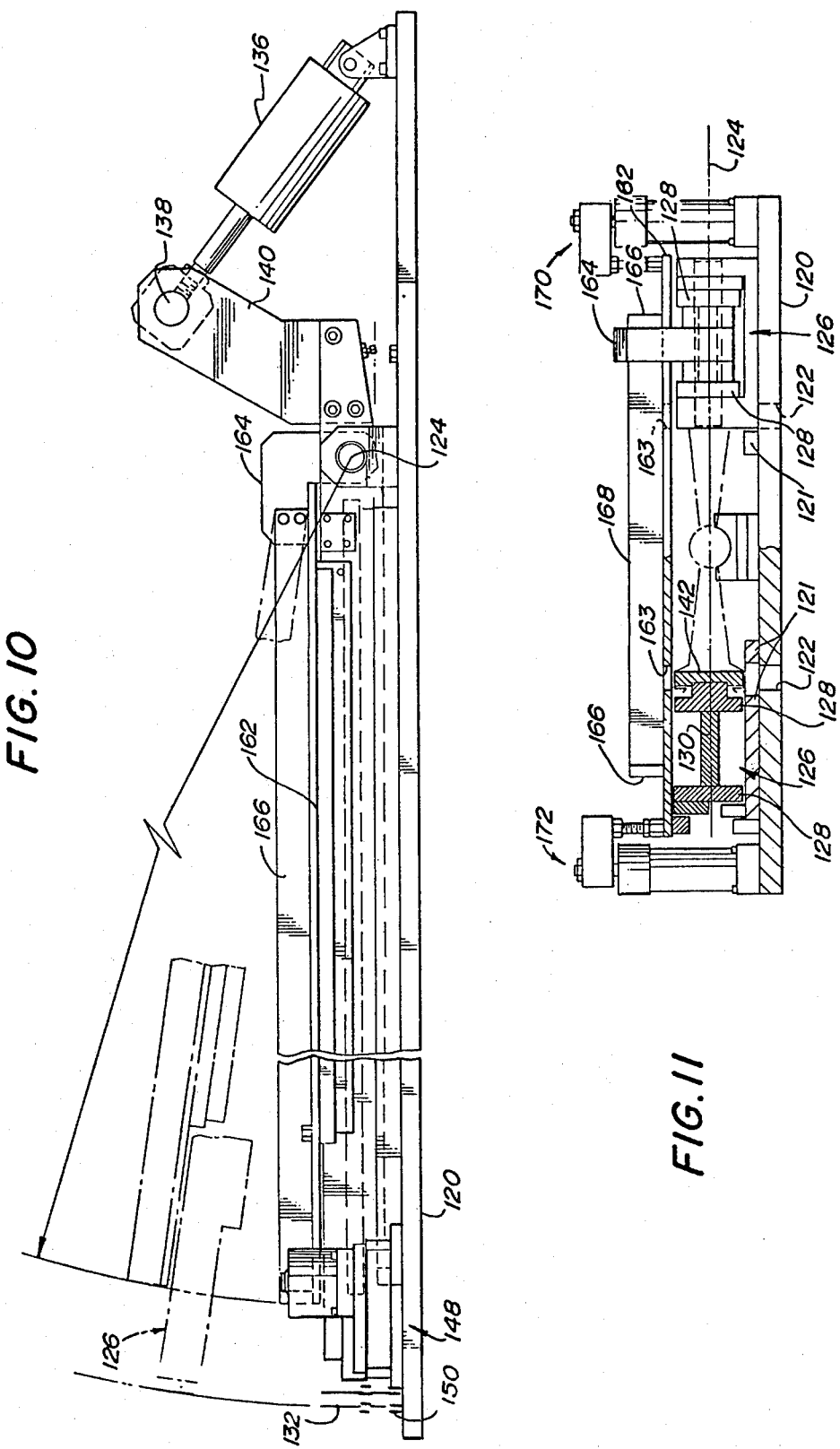

ELECTRODE AND APPARATUS FOR FORMING THE SAME

This is a division, of application Ser. No. 791,725, filed Apr. 28, 1977, now U.S. Pat. No. 4,129,292.

BACKGROUND OF THE INVENTION

The subject invention relates in general to the art of electrolytic cells, especially alkali metal chlorate or hypochlorite and diaphragm-type chlor-alkali cells and, more particularly, to an expandable anode assembly for use in such cells and an apparatus for forming the same.

Although the invention could be used in many types of electrolytic cells, it will be described with reference to an embodiment particularly suited for use in commercial size electrolytic cells. In these cells, the electrodes are typically large and must be maintained planar and in uniform, closely-spaced relationship for most efficient operation. As is discussed at length in U.S. Pat. No. 3,674,676 issued July 4, 1972 to Fogelman, the efficiency of such cells is closely related to the spacing or gap between the anode and the cathode. In order to reduce the gap to the minimum possible, various constructions and assembly techniques have been developed to assure that the electrode surfaces are maintained planar and parallel. (For example, see copending U.S. patent application Ser. No. 514,143, filed Oct. 11, 1974). Moreover, various adjustable or expandable structures have permitted the anodes to be collapsed to a narrow configuration for insertion into the cell between spaced cathodes and then expanded so that the working faces or anode faces are spaced a desired distance from the cathode. Expandable anodes of this general type are shown and described in the aforementioned U.S. Pat. No. 3,674,676 which is incorporated herein by reference.

The expandable anodes are desirable for many reasons. The prior designs have, however, presented certain problems. The primary problem encountered has been difficulty in maintaining the anode surfaces parallel in all positions of movement between fully collapsed and fully expanded. Additionally, it has been difficult to maintain the anode surfaces planar. That is, the loads imparted to the anode surface forming sheets by the adjustable connecting means have tended to warp the sheets in certain positions of adjustment. Prior attempts at overcoming these problems have resulted in subdividing the individual sheets or faces into plural, independent sections or adding stiffening or reinforcing members to the sheets. Neither approach has been particularly satisfactory.

BRIEF DESCRIPTION OF THE INVENTION

The subject invention overcomes the above discussed problems and provides an expandable electrode assembly wherein the sheet members which form the electrode surfaces are connected to the riser by electrically conductive connecting means which are joined to each sheet at spaced locations and permit movement of each sheet in directions perpendicular to the riser while maintaining the sheet in tension between the spaced locations. Preferably, the connecting means are joined to the sheets at locations spaced substantially equal distances from the riser. The connecting means preferably comprises one or more shaped sheets or leaves of metal each having a first end portion connected to the anode riser and central portion which extends outwardly from the riser in a direction generally parallel to the associated electrode sheet. A second end portion extends toward the anode sheet and is connected thereto. The shape of the leaves and their points of connection to the anode sheets are such as to place each anode sheet in tension in the area between the points of connection. Additionally, the nature of the leaves is such that the electrode sheets can be moved toward and away from the riser while the tension forces are maintained in the electrode sheets. Consequently, the forces act to maintain the sheets planar and prevent warpage.

According to a further aspect of the invention, apparatus is provided for assembling an electrode subassembly of the type described comprising a central riser and a pair of V-shaped connector members. Preferably, the apparatus includes first support means for supporting an elongated riser member to extend generally horizontally along a first axis. Second support means are provided for supporting a first sheet connecting member subjacent the first axis. Opposed pairs of clamping members are mounted on generally opposite sides of the axis for selective clamping movement toward the axis to rigidly hold a riser member carried by the first support means. And, first means are carried by the clamp members for locating and positioning a first sheet connecting member supported by the second support means to maintain the sheet connecting member in alignment with the riser member. The clamp members further include second means for supporting a second connecting member in alignment with the axis on the side opposite the first connecting member.

A further aspect of the invention concerns apparatus for joining the electrode surface defining sheets to the above-discussed subassembly. Preferably, this apparatus comprises a base member adapted to support a first sheet member in a generally horizontal position. Associated with the base member is a movable support means for holding a subassembly in a position wherein the riser member extends generally horizontally with the connector members extending laterally. Actuating means are provided for moving the movable support means to cause the free end portions of the connector members to engage the first sheet. Additionally, a movable platen member is mounted over the movable support means and arranged for movement toward the base so that the sheets and the subassembly can be clamped together for a subsequent welding operation.

In accordance with a more limited aspect of the invention, means are preferably provided to apply a prestress to the sheets to compensate for internal stresses produced during the welding operation.

OBJECTS OF THE INVENTION

Accordingly, a primary object of the invention is the provision of an electrode assembly wherein the working face or faces are mounted to a riser member by means which permit movement of the face toward and away from the riser while imposing a tension force in the working face to maintain it in a planar condition.

A further and more limited object is the provision of an electrode assembly wherein a pair of working faces are mounted on opposite sides of a riser member by connector means which permit movement of the working faces toward and away from one another while maintaining them parallel and planar.

Yet another object is the provision of apparatus for forming electrodes of the type described wherein the components are held in a prestressed condition to assure the introduction of desired, internal stresses in the finished electrode.

A still further object is the provision of an electrode of the type described which is comparatively easy to fabricate.

BRIEF DESCRIPTION OF THE DRAWINGS

The above and other objects and advantages will become apparent from the following description when read in conjunction with the accompanying drawings.

FIG. 1 is a pictorial view of a collapsible electrode formed in accordance with a preferred embodiment of the invention (portions of the electrode surfaces have been broken away to show certain details of construction more clearly);

FIG. 1A is an enlargement of one of the connector members;

FIG. 2 is a cross-sectional view taken on line 2—2 of FIG. 1 showing the electrode in its expanded condition;

FIG. 3 is a cross-sectional view similar to FIG. 2 but showing the electrode in a collapsed condition;

FIGS. 4 and 5 are somewhat diagrammatic views showing the sequence used in forming the electrode of FIGS. 1-3;

FIG. 7 is a side elevation of the apparatus shown in FIG. 6 (FIG. 7 is taken on line 7—7 of FIG. 6);

FIG. 8 is an end elevation taken on line 8—8 of FIG. 6;

FIG. 10 is a side elevation taken on line 10—10 of FIG. 9; and,

FIG. 11 is a cross-sectional view taken on line 11—11 of FIG. 9.

DETAILED DESCRIPTION OF THE DRAWINGS

Figure 6:
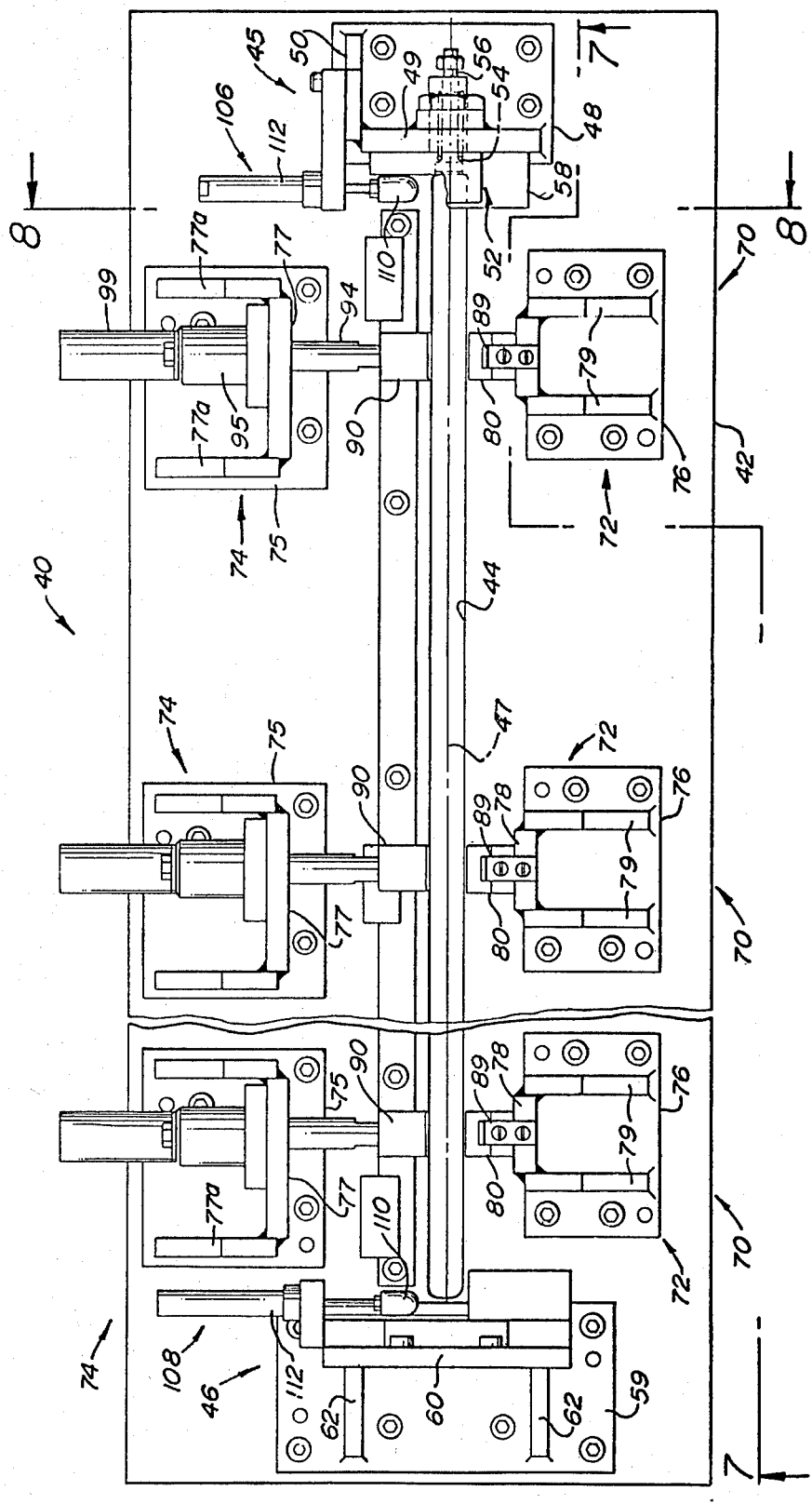
FIG. 6 is a plan view of the preferred form of apparatus used for assembling the connector members to the riser as illustrated in FIG. 4.

Referring more particularly to the drawings wherein the showings are for the purpose of illustrating a preferred embodiment of the invention only and not for the purpose of limiting same, FIGS. 1-3 show the overall arrangement of an electrode assembly 10 of the general type described in U.S. Pat. No. 3,674,676 to Fogelman issued July 4, 1972. In the subject embodiment, the anode assembly is shown as comprising an anode riser member 11 which carries and supports electrically-conductive expanded metal sheet members 12 which define the electrode surfaces 13. The anode riser member 11 could have many constructions and configurations but, in the subject embodiment, generally comprises a cylindrical member with a conductor core 14 formed from a copper tube or the like which has carried thereon a titanium cover 15 clad or otherwise positively connected to the tube. As can be appreciated, the conductor or riser member 11 can be formed from many different combinations of materials depending upon the environmental conditions to which it is to be subjected. For example, U.S. Pat. No. 3,591,483 to Loftfield et al. suggests a variety of material combinations which have been found suitable for use in conventional electrolytic cells.

The upper end of the anode riser member 11 is closed by a titanium cap member 16 which is welded or otherwise sealingly connected to the clad conductor tube. Connected about the lower end of the riser 11 is a mounting flange 17 formed from a suitable titanium alloy to permit the unit to be suitably mounted to a base member within a catalytic cell (not shown). Additionally, an insert member 19 is received within the end of the tube and has suitable threads 20 to provide a mounting or connecting means for the anode assembly.

Of comparative importance to the subject invention is the overall arrangement and construction of the anode surface-defining members and their connection to the riser 11. As previously discussed, the anode sheets can be formed from many different materials and have a variety of types of electrically conductive surfaces carried thereon. In the subject embodiment, however, the surfaces 13 are carried by foraminous sheets of titanium expanded or perforated to form a mesh-like member best illustrated in FIG. 1. Preferably, approximately one-half of the total area of the sheet is open as shown. Additionally, the entire area of each sheet is perforated or expanded uniformly.

In the subject embodiment, the sheets 12 are connected to the riser 11 in a manner which permits them to be moved between expanded and collapsed conditions as shown in FIGS. 2 and 3, respectively. It should be appreciated that the connecting means must be capable of providing a suitable electrical connection between the riser member 11 and the anode sheets 12. Additionally, the connection should preferably be such that during the movement between the collapsed and expanded condition, sheets 12 are maintained planar and in closely parallel relationship. The reason for this has been discussed earlier, however, and it should be noted that the efficiency of the electrolytic cell depends upon the closeness of the spacing between the anodes and the associated cathode surfaces. Non-planar surfaces require that the spacing be wider than desirable with corresponding loss in efficiency.

According to the subject invention, the connector means are such that a tension force T is maintained on the anode surfaces during adjustment between collapsed and expanded condition. The presence of the tension force between the connection points 12a serves to maintain the anode surface in a planar condition.

Many different types of connector arrangements could be used for resiliently mounting the anode surfaces to the conductor and maintaining the tension forces between the connection points. The preferred arrangement, however, comprises a pair of generally V-shaped, formed metal connectors 22 best illustrated in FIGS. 1A and 2. As shown, each of the connector members 22 has a somewhat V-shaped configuration including a generally flat bight portion 23 and a pair of integrally formed leg or leaf portions 24. In its nonstressed condition, the leaf portions 24 preferably form an angle of approximately 6 degrees relative to the mid-plane 26. At the outer ends of the leaf portions 24, a short leg portion 28 extends at nearly a right angle to the leaf portions and joins with a connecting surface portion 30. FIG. 1A illustrates the preferred relative sizes of the leaf portions and the leg portion 28. It should be noted that there is an included angle of approximately 105 degrees between the leg portions 28 and the associated connecting portions 30. The connecting portions 30 are provided with a small hook-shaped section 32 at their outer ends to provide means for maintaining the anode in its collapsed condition in a manner shown in FIG. 3.

The members 22 could be formed from a variety of materials depending upon the conditions discussed above with respect to the other components of the assembly. In the subject embodiment, however, the members 22 are formed from commercially pure titanium.

In forming the anode assembly of FIGS. 1-3, the V-shaped connector members are first joined to diametrically opposite sides of the anode riser member 11. FIG. 4 illustrates, in diagrammatic form, the first step in the formation of an anode. That is, the V-shaped connector members are positioned on opposites of the anode riser member 11 and a closely-spaced series of spot welds are made to join the connectors to the anode to provide both structural integrity and suitable electrical conductivity. The welding can be accomplished in many ways but welding electrodes 35 reciprocated in from opposite sides can form the necessary welds. Preferably, at least every other strand or ribbon of the titanium sheets are joined to the conductor. Additionally, it is important that the conductors be joined such that their connector surfaces 30 are suitably aligned. Thereafter, as best shown in FIG. 5, the preformed sheet members 12 are positioned on the surfaces 30 and suitably joined thereto. Preferably, this is accomplished by a series of spot welds which electrically and structurally connect the connector members to the sheet members. To carry out the welding operation heavy conductor bars 37 are temporarily positioned between the ends of the connectors. The welding electrodes 35 are subsequently reciprocated from the position shown to complete the welding.

With the anode assembly formed in this manner, collapsing movement of the sheets causes the leaf portions 24 to be loaded with a bending moment. The leaf portions 24 take on a slightly S-shaped configuration. The leg portions 28 are primarily loaded in compression resulting in a tension force applied to the surface of the anode member between the two series of welds. Because the assembly is fabricated planar and parallel in its open position as illustrated in FIG. 2, movement of the anode surfaces to a collapsed condition (such as shown in FIG. 3) maintains the relationship because of the resulting tension forces in the members. Consequently, the induced forces within the assembly tend to maintain the anode sheets planar during the movement between open and collapsed positions.

Although forming no particular part of the subject invention, the assembly preferably includes clip members 34 arranged to connect with the hook-shaped portions 32 to maintain the assembly in a desired position of adjustment.

The preferred apparatus for carrying out the assembly step of FIG. 3 is shown in FIGS. 6-8. In general, apparatus 40 preferably comprises an elongated, rigid base plate member 42. A through groove or opening 44 extends longitudinally of the base plate 42. Carried at opposite ends of the base plate 42 are first support means 45 and 46 which function to support an anode riser member 11 to extend horizontally and parallel to the base plate 42 along an axis 47 in alignment with the opening or groove 44.

Many different types of support means could be used for supporting the anode riser 11 to extend horizontally along axis 47. In the subject embodiment, the support means 45 comprises a first base member 48 which is suitably connected to the base plate 42. A vertically-extending plate member 49 is welded or otherwise positively joined to plate 48 and extends upwardly therefrom. A reinforcing plate 50 extends between the base plate 48 and the vertically-extending plate 49. Carried at the upper end of the plate 49 is a locator assembly 52. The locator assembly 52 includes a spring cartridge 54 having a plunger member 56 extending therethrough and biased to the left as viewed in FIG. 7. A suitable L-shaped support member 58 extends outwardly from the left-hand face of the plate member 49 for engaging the flange end portion of the riser member 11.

The opposite end of the riser member 11 is engaged and supported by the support means 46 located at the opposite end of plate member 42. The support means 46 comprises a base member 59 having a vertically-extending plate member 60 connected thereto and braced by a pair of angle brace members 62. A locator member 66 is carried at the right-hand side of the bar 60 (as viewed in FIG. 7) and receives the cap end of the anode riser 11. To place the anode riser between the support means, the flange end is first located on the support means 45 and forced to the right against the bias of the spring plunger 56. Thereafter, the opposite end is lowered into alignment with the locator 66. Thus, the anode riser is positively held between the support means 45, 46.

The assembly 40 further includes means for positively holding and locating the connector members 22 in proper alignment with the anode riser member 11. For this purpose, a series of clamp assemblies 70 are mounted in spaced locations on opposite sides of the opening 44. In the subject embodiment, each of the clamp assemblies are comprises of a pair of clamp units 72, 74. The clamp units 72 are each rigidly mounted to the base plate 42 in the location shown. Each clamp unit 72 comprises a base member 76 and an upwardly extending support member 78. A pair of reinforcing plates 79 are joined to the rear face of 78. Extending outwardly from plate 78 is a clamp bar member 80 having the configuration best illustrated in FIG. 8. As shown, the clamp bar 80 includes a recess portion 82 adapted to receive the anode riser member 11. A pair of inclined faces 84 are carried on the upper and lower sides of the recess 82. The faces 84 are inclined at an angle corresponding to the angle of the leaf members 24 of the connectors 22. At the upper end of the clamp bar 80, a recess 86 is provided for receiving the leg portion 28 of the associated connector 22. A similar recess 88 is formed at the lower end of the clamp bar 80. Additionally, a spring locating finger 89 extends from the top of clamp bar 80 to position the upper connector 22.

Each of the clamp units 72 are positioned to cooperate with a corresponding clamp unit 74. As best seen in FIGS. 6 through 8, the clamp units 74 include a base member 75 connected to base 42 and supporting a vertically extending plate 77. Suitable brace members 77a are connected between base 75 and plate 77.

Each clamp unit 74 further includes a movable clamp bar 90 having a clamping face 92 configured to correspond to the face of clamp bar 80. The clamp bar 90 is mounted for movement toward and away from the associated clamp bar 80 so that it can be moved between the dotted and solid line positions illustrated in FIG. 8. As shown, the upper end of clamp bar 90 is carried from a shaft 94 slidably mounted in a conventional bearing or bushing assembly 95 supported in plate 77. The lower end is similarly mounted from a shaft 96 carried by a corresponding bushing 97.

The clamp bar 90 is actuated between the dotted and solid line positions by an air cylinder 99 which is connected to the vertically-extending plate 77. The piston rod 102 of the cylinder 99 extends outwardly through plate 77 and is connected to the midpoint of the clamp bar 90.

Associated with the clamp bars and carried from the base plate 42 is a suitable locating member 104 which cooperates with recess 88 of clamp member 80 to support the lower connector member 22 to hold it in located position until actuation of the clamp bar 90 to its clamping position.

To use the assembly thus far described, the clamp bar 90 is retracted to its dotted line position of FIG. 8. At this time, a connector member 22 is mounted in the lower dotted line position resting upon the locator member 104 and within the recess 88 of clamp bar 80. Thereafter, a riser member 11 is moved into position between the support means 45 and 46. As can be seen, the relationship is such that the anode riser member 11 is substantially in engagement with the connecting surface 23 of the lower connector 22. The uppermost connector 22 is thereafter moved into position on the diametrically opposite or upper surface of the anode riser 11. In order to hold the upper connector 22 in position until the clamp bars 90 have been actuated, the assembly includes a pair of movable locator assemblies 106 and 108 associated with the support means 45, 46, respectively. The locator means 106 and 108 each include a movable locating member 110 carried at the outer end of the piston rod of an air cylinder 112. The air cylinders 112 are suitably supported from the support means 45, 46 in the manner shown. Actuation of the air cylinders 112 move the locating members into position such that a connector member 22 placed on the upper side of the riser member 11 is held in located position until the clamp bars 90 are actuated to the closed or solid line configuration of FIG. 8. At this time, the three components, i.e., the anode riser, and the two connectors, are positively held in a located position for a subsequent welding operation.

As can be appreciated, with the structure thus far described, welding can take place by the introduction of suitable resistance welding electrodes 35 in the manner shown in FIG. 4. The construction of the apparatus is such that the lower electrode 35 passes upwardly through the recess or groove 44 to engage the bight portion of the lower connector. The upper electrode 35 can move downwardly between the legs of the upper connector 22 and engage at the diametrically opposite side of the anode riser. Thereafter, sequential movement of the assembly between the electrodes can produce the required series of spot welds between the connectors and the riser.

Figure 9:
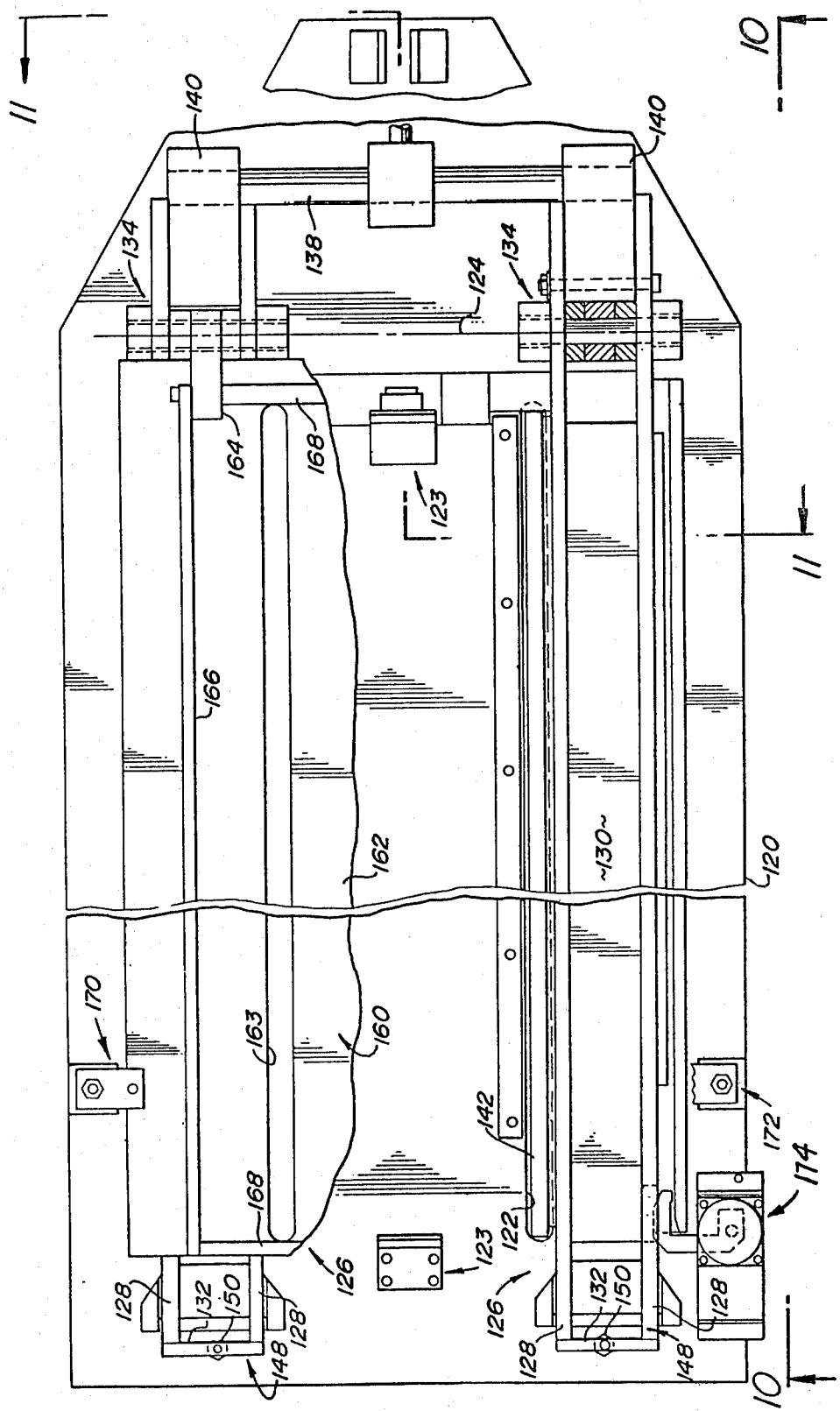
FIG. 9 is a plan view of the apparatus used for connecting the electrode surface forming members to the connectors as broadly illustrated in FIG. 5 (portions of the apparatus have been broken away to show details of construction more clearly)

The apparatus used for carrying the assembly step of FIG. 5 is preferably as shown in FIGS. 9-11. This apparatus is designed so as to maintain the proper orientation and relationship between the previously-assembled riser subassembly relative to the opposed electrode surface-defining sheet members 12. Although the apparatus could take many forms, it is shown as comprising an elongated base or support member 120 having longitudinally extending bars 121 positioned to support the lower electrode sheet spaced upwardly slightly from the base (See FIG. 11). A spaced pair of recesses or grooves 122 extend through the base 120 (See FIG. 11). The through grooves or recesses 122 are spaced laterally apart a distance corresponding to the distance between the connector surfaces 30 (i.e., distance d shown on FIG. 2) on each side of the anode assembly. Located midway between the grooves 122 are support saddles 123 for holding a conductor bar 11 to extend parallel to the grooves carried from the base member and mounted for pivotal movement about a horizontal, transverse axis 124 are a pair of elongated arm members 126. Each of the arm members 126 include a pair of parallel, vertically-extending elongated bars 128 joined by a horizontally positioned plate member 130. End plates 132 are connected across the left-hand ends of the plate members 128 (as viewed in FIG. 9). The arm members 126 are, as previously mentioned, mounted for pivotal movement about axis 124 by suitable bearing or hinge assemblies 134. Selective tilting movement is provided by an actuating cylinder 136 (See FIG. 10) having its cylinder pivotally connected to the right-hand end of the base plate 124. The piston rod end of the cylinder 136 is pivotally connected to a horizontally-extending actuating bar 138 which has its opposite ends connected to arms 140 which extend upwardly from between the right-hand ends of plates 128 of each of the arm assemblies 126. Actuation of the cylinder 136 can thereby move the arm assemblies 126 from the solid line position of FIGS. 10 and 11 to a raised dotted line position as shown in FIG. 10.

Carried by the innermost plate member 128 of each arm assembly 126 is an elongated copper conductor bar 142 best illustrated in FIGS. 9 and 11. It should be noted that the conductor bars 142 have a vertical height generally equal to the spacing between the connector portions 30 of each of the connector members 22. They correspond to bars 37 described with reference to FIG. 5.

With the arm assemblies 126 in the raised or dotted line position of FIG. 10, the riser and connector member subassembly can be slid onto the conductor bars 142 in the manner shown in FIG. 11. Thereafter, lowering of the arm assembly brings the connector members 11 downward into close engagement with the base plate with their connecting surfaces 30 in alignment with the base grooves or recesses 122. The position of the arm assemblies 126 in the lowered condition are maintained by suitable locating assemblies 148 located at the left-hand end of the base plate 120. The locating members 148 are formed so as to engage laterally opposite sides of each individual arm assembly 126 to hold it in proper alignment relative to the base. Additionally, each arm assembly 126 preferably includes an adjusting stud member 150 extending upwardly from the base to limit or adjust the total downward movement of the arm assemblies.

Associated with the arm assemblies 126 is an upper platen member 160 which comprises a large rectangular plate 162 having a pair of elongated grooves or recesses 163 formed therethrough in alignment with the grooves or recesses in base member 120. The plate 162 is connected at its right-hand end to a pair of vertically extending members 164 which are pivotal above axis 124. As shown, suitable reinforcing side rail members 166 extend longitudinally of the upper platen member 162 and are connected at their opposite ends by end rail support members 168. This provides an upper platen which has suitable rigidity and can hold the upper sheet member 12 in close engagement with the connecting surfaces of the connector members 22. Additionally, the upper platen member or assembly 160 holds the upper member 12 generally planar for the subsequent welding operation.

To use the apparatus thus far described, the arm assemblies 126 are moved to the raised or dotted line position of FIG. 10. At this time, the lower electrode sheet 12 is moved into position on the base member to the location shown in FIG. 11. Thereafter, the riser and conductor subassembly is slid into position on the raised arm assembly 126. With the riser and conductor subassembly in position, the upper electrode or anode surface sheet 12 can be positioned over the subassembly and the arm assembly 126 and the platen assembly 160 moved to the solid line position of FIG. 10. A suitable locating clamp 174 (see FIG. 9) is then actuated to engage the sides of the electrode sheets and thereby hold them in a fixed position so that suitable clamp members 170 and 172 can subsequently be actuated to maintain the electrode sheets in their proper relationship. Thereafter, the entire apparatus can be moved under suitable resistance welding heads so that a series of spot welds can be formed longitudinally of the assembly in the manner described with reference to FIG. 5.

In order to assure proper engagement between the connecting portions 30 and the associated electrode sheets 12, the bars 142 (see FIG. 11) are of non-uniform height throughout their length. Preferably, the bars have a greater height at the center and taper uniformly toward each end. This applies a prestress to the assembly which results in a more nearly flat and parallel relationship between the electrode sheets. The amount of height difference along the length of the bars 142 will vary depending upon the size of the electrode assembly, but only a few thousandths difference is usually sufficient.

The invention has been described in detail sufficient to enable one of ordinary skill to make and use the same. Obvious modifications and alterations of the preferred embodiments will occur to others upon reading and understanding the specification. It is our intention to include such modifications as part of our invention insofar as they come within the scope of the appended claims.

What is claimed is:

1. Apparatus for forming an electrode subassembly of the type including a generally cylindrical riser member and a pair of longitudinally extending V-shaped connector members which have their bight portions joined to the riser member on diametrically opposite sides with the leg portions extending radially, said apparatus comprising:

a base member having a longitudinally extending through groove;

pairs of cooperating clamp members located on said base on opposite sides of said through-groove, at least one clamp member of each pair being mounted for movement toward said groove;

first support means associated with said base for supporting a first V-shaped connector member with its bight portion aligned with said groove and its legs extending toward said base and on opposite sides of said groove;

second support means for supporting a riser member over said groove and in axial alignment therewith, said second support means adapted to hold a cylindrical riser member over and in engagement with the bight portion of a connector member supported on said first support means;

said clamp members including contoured surfaces for supporting a second connector member with its bight portion aligned with said groove and its legs extending away from said base; and, means for actuating said clamp members for positively holding the connector members in position relative to the riser member.

2. Apparatus for forming an electrode subassembly of the type including a generally cylindrical riser member and a pair of longitudinally extending V-shaped connector members which have their bight portions joined to the riser member on diametrically opposite sides with the leg portions extending radially, said apparatus comprising:

a base member having a longitudinally extending through groove;

support means located on said base at opposite ends of said groove for supporting a cylindrical riser member to extend in alignment with said groove and parallel to said base; and clamp means located on opposite sides of said groove, said clamp means including clamp faces contoured to engage and position longitudinally extending V-shaped connector members on diametrically opposite sides of the riser member with the bight portions aligned with the groove and in engagement with the riser.

3. Apparatus as defined in claim 2 wherein said clamp means include selectively operable power means for producing relative movement of said clamp faces toward and away from one another.

4. Apparatus as defined in claim 2 including means carried by said clamp means for locating said connector members.

* * * * *